United States Patent
Chuang

(10) Patent No.: US 6,693,865 B2
(45) Date of Patent: Feb. 17, 2004

(54) PROTECTION METHOD FOR PREVENTING OPTICAL DISK DRIVES FROM LASER LEAKAGE

(75) Inventor: Roger Chuang, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 10/230,336

(22) Filed: Aug. 29, 2002

(65) Prior Publication Data

US 2003/0043715 A1 Mar. 6, 2003

(30) Foreign Application Priority Data

Aug. 29, 2001 (TW) ........................... 90121387 A

(51) Int. Cl.$^7$ ................................. G11B 7/00
(52) U.S. Cl. .................................... 369/53.3
(58) Field of Search ........................ 369/120, 121, 369/122, 116, 53.3, 47.55

(56) References Cited

U.S. PATENT DOCUMENTS 6,351,441 B1 * 2/2002 Andoh ...................... 369/53.3

* cited by examiner

*Primary Examiner*—Nabil Hindi
(74) *Attorney, Agent, or Firm*—Birch, Stewart, Kolasch & Birch, LLP

(57) ABSTRACT

A protection method that prevents optical disk drives from Laser leakage is provided. First, determine whether switch detector has generated a close-status signal of the optical disk drive or not: if yes, then forward kick the spindle motor. Next, feed back the actual revolving speed of the spindle motor. Then, determine whether the actual revolving speed is lesser than the empty-tray revolving speed or not: if yes, then emit Laser rays to read CD data, otherwise, halt emitting Laser rays and perform system routine operations of the optical disk drive. The invention not only helps to reduce production cost but also effectively detects whether a CD has been placed into the optical disk drive or not during the failure of a switch detector, thus avoiding Laser leakage that causes harm to users.

12 Claims, 2 Drawing Sheets

PROTECTION METHOD FOR PREVENTING OPTICAL DISK DRIVES FROM LASER LEAKAGE

This application incorporates by reference of Taiwan application serial no. 090121387, filed Aug. 29, 2001.

BACKGROUND OF THE INVENTION

1. Field of the Invention

The invention relates in general to a protection method for preventing optical disk drives from Laser leakage, and more particularly to a protection method that prevents optical disk drives from Laser leakage by means of a switch detector and an electronic detecting method.

2. Description of the Related Art

Living in today's society where science and technology advance and change rapidly, optical disk drive has become an indispensible appliance to modern people. Among the optical disk drives available today, the Compact Disk-Read Only Memory drive (CD-ROM drive) and the Digital Versatile Disk player (DVD-ROM player) are two products which have won great popularity. For example, the users can listen to beautiful music from CD using a CD-ROM drive or watch touching movies using a DVD player which is indeed very convenient. The optical disk drives used in the above-mentioned purposes are either open-top type optical disk drives or tray type optical disk drives. Both two types have an exposed pickup head. Lacking any shielding protection, it is possible that Laser rays emitted by the pickup head would leak out and thus cause harm to users which is very dangerous. In consideration of preventing Laser leakage and protecting users, an extra switch detector is added to the abovementioned optical disk drives. Laser rays will be emitted only if the top cover of an open-top optical disk drive or the tray of a tray optical disk drive are detected to be closed. Under the circumstance that the first switch detector fails to work properly, the extra one helps to reduce the possibility of mistaking the top cover of an open-top optical disk drive or the tray of a tray optical disk drive to be closed. Hereinafter, the slim type (notebook personal computer) tray optical disk drive will be used as an example with attached drawings.

Please refer FIG. 1, a top view of a tray type optical disk drive with its tray being open. In FIG. 1, the optical disk drive 100 comprises a casing 102, a motherboard 104, a control unit 106, a switch detector 108, a tray 110, a spindle motor 112 and a pickup head 114. The tray 110 is installed inside the casing 102 in a movable way, and can depart from or slide into the casing 102 according to the directions of the arrow 150 shown in FIG. 1. So the open/close status of the tray 100 allows users to displace CDs. When the optical disk drive opens its tray, i.e. the tray 110 is opened, the user can place the CD 120 on the circular disk carriage 116 of the tray 110 (for instance, along the direction of the arrow 160 shown in FIG. 1). The center point hole 122 of the CD 120 joints with the spindle motor 112 at the center point of the disk carriage 116. When the spindle motor 112 revolves, the CD 120 will be driven to revolve accordingly. The pickup head 114 is installed at the channel 118 of the tray 110 in a movable way, and moves back and forth at the channel 118 along the direction of the arrow 170 emitting Laser rays to detect whether the CD 120 has been placed on the tray 110 or not and read the data stored in the CD 120. Besides, the motherboard 104, control unit 106 and the switch detector 108 are installed inside the casing 102. Of which, the control unit 106 and switch detector 108 are installed on the motherboard 104 and are coupled with it, whereas the control unit 106 is coupled with the switch detector 108.

When the optical disk drive 100 closes its tray, the tray 110 slides towards the casing 102 along the direction of the arrow 150 shown in FIG. 1 until the switch detector 102 is touched. After having been touched by the tray 110, the switch detector 108 will send a close-status signal to the control unit 106 indicating the optical disk drive is closed. Next, the control unit 106 receives the closed-status signal and controls the pickup head 114 and the spindle motor 112 accordingly. Whether the CD 120 is placed on the tray 110 or not will be detected when the CD 120 is driven to revolve by the spindle motor 112. Having confirmed the existence of a CD, the pickup head 114 emits Laser rays and starts to read data from the CD 120. Along the direction of the arrow 170 shown in FIG. 1, the pickup head 114 moves step by step and emits Laser rays continually reading data stored in the CD 120 from inner tracks outwardly.

It is noteworthy that under normal circumstances when the tray is open, it will not touch the switch detector 108 and not any signal will be sent to the control unit 106. When the tray 108 is closed, the switch detector 108, being touched by the tray 110, will generate and send a close-status signal to the control unit 106 allowing the control unit 106 to control the pickup head 114 to emit Laser rays according to the close-status of the optical disk drive and the feedback signal of the spindle motor 112. With the tray 110 being enclosed inside the casing 102, the Laser leakage that causes harm to users can thus be prevented under the shielding protection of the casing 102 and the CD 120.

The above discussion is limited to the tray type optical disk drives only. As for the open-top optical disk drive, the discussion is as follows. The open-top optical disk drive has a structure similar to that of a tray type optical disk drive. The difference between them is that the open-top optical disk drive has a fixed tray in which a CD is accommodated with a top cover situated on top of it. When the top cover is opened, the user can place the desired CD on it; after that, the top cover is closed and the optical disk drive will be used to read the CD. Therefore, to achieve the same detecting function, i.e. detecting the close/open status of the optical disk drive and to prevent Laser leakage, the user only needs to install a switch detector in such a way that it can be initiated when the top cover closes to the casing.

However, after having been in service for a period of time, the motherboard 104 will start to experience short-circuits because of rusty circuits. The control unit 106 might mistake short-circuits for the close-status signal sent by the switch detector and continually control the pickup head to emit Laser rays. As a consequence, Laser rays will be emitted with an open and empty tray 110 resulting in Laser leakage which causes harm to users. Since the switch detector 108 is a mechanic structure, it is apt to develop aging and mechanic breakdown after having been in service for a period of time. Consequently, the switch detector 108 is likely to mistake the open-status of the tray 110 for the close-status and send the close-status signal to the control unit 106. The control unit 106 will then control the pickup head 114 to emit Laser rays according to the close-status received resulting in an open and empty tray 110 with Laser leakage which is indeed very dangerous and might cause harm to users.

In order to prevent the failure of the switch detector 108 which leads to Laser leakage, an extra switch detector is added to satisfy safety requirements. Generally speaking, an optical disk drive always uses two switch detectors to reduce the probability of errors. Apart from increase in production cost, the second switch detector, being a mechanic structure, cannot be free from aging and mechanic breakdown.

SUMMARY OF THE INVENTION

It is therefore an object of the invention to provide a protection method that prevents Laser leakage of an optical disk drive. Its electronic detecting method, which replaces the design of adding a second switch detector to a conventional optical disk drive, not only helps to reduce production cost but also effectively detects whether a CD has been placed into the optical disk drive or not, thus avoiding Laser leakage that causes harm to users.

According to the object of the invention, a protection method preventing optical disk drives from Laser rays leakage is provided. Of which, the optical disk drive is able to accommodate a CD and comprises at least a switch detector, a spindle motor and a pickup head, wherein the switch detector is used to detect the open/close status of the optical disk drive. Under normal circumstances, when the optical disk drive is closed, the switch detector will be initiated and generate a close-status signal. Whereas the spindle motor which is used to drive a CD has an empty-tray revolving speed when the optical disk drive is not loaded with any CD. When the optical disk drive has been loaded with a CD the spindle motor will have a revolving speed lesser than the empty-tray revolving speed and the pickup head will emit Laser rays to read data from CD.

The protection method first of all determines whether a close-status signal has been generated or not. If yes, then forward kick the spindle motor. Next, feed back the actual revolving speed of the spindle motor and determine whether the actual revolving speed is lesser than the empty-tray revolving speed or not: if yes, then emits Laser rays to read CD data, otherwise, performs system routine operations of the optical disk drive without emitting Laser rays.

According to the object of the invention, another protection method preventing optical disk drives from Laser rays leakage is provided. Of which, the optical disk drive is able to accommodate a CD and comprises at least a spindle motor and a pickup head, wherein the pickup head emits Laser rays to read CD data.

The protection method first of all determine whether the optical disk drive is closed or not. If yes, then forward kick the spindle motor. Next, determine whether the actual revolving speed of the spindle motor is lesser than the empty-tray revolving speed or not. If yes, then emits Laser rays to read CD data.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

According to the invention, a protection method that prevents optical disk drives from Laser leakage is particularly designed. What is different from a conventional optical disk drive is that while remaining the same switch detector of mechanic structure, the second switch detector of a conventional optical disk drive is replaced by a programmed electronic detecting method. Therefore the invention decreases production cost and at the same time maintains a double detecting method which satisfies safety requirements. What is more, during the failure of the switch detector, the programmed detecting method can effectively detect whether the optical disk drive has been loaded with a CD or not avoiding Laser leakage that causes harm to users. Of which, the protection method according to the invention is applicable to all types of optical disk drives using Laser rays to read or write data. For example, Compact Disk-Read Only Memory drive (CD-ROM), Digital Versatile Disk player (DVD-ROM player), CD-R, CD-RW, DVD-R, DVD-RAM, DVD-RW, and particularly, optical disk drives of open-top type, suck-in type and tray type. Moreover, the structure of the optical disk drive used in the invention is the same as that of the conventional optical disk drive in FIG. 1 therefore a repetition of description is not needed. As for how the protection method prevents the optical disk drive from Laser leakage will be further elaborated in a preferred embodiment according to the invention.

Figure 1:
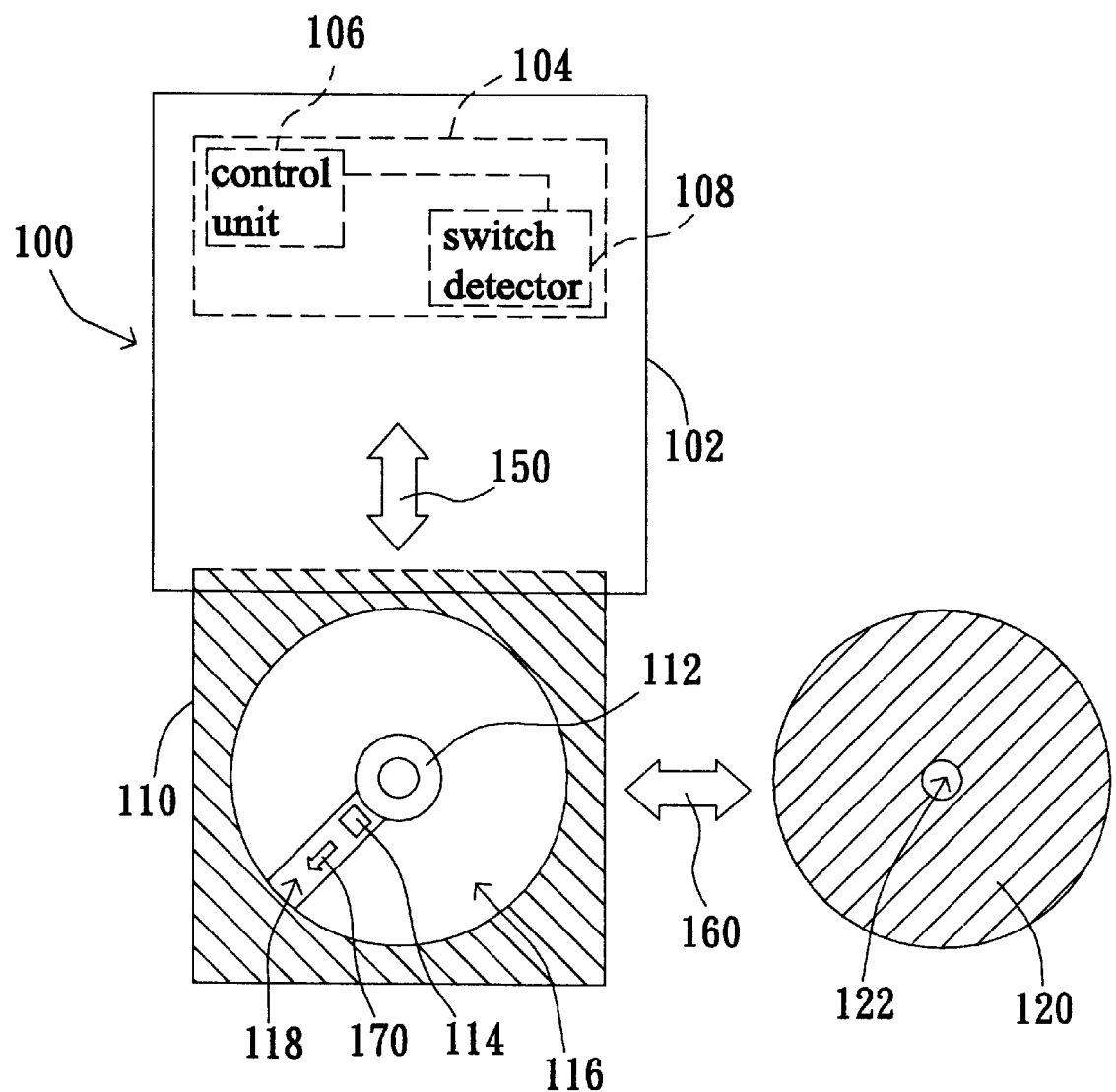
FIG. 1 shows a top view of a tray type optical disk drive with an open tray.
Figure 2:
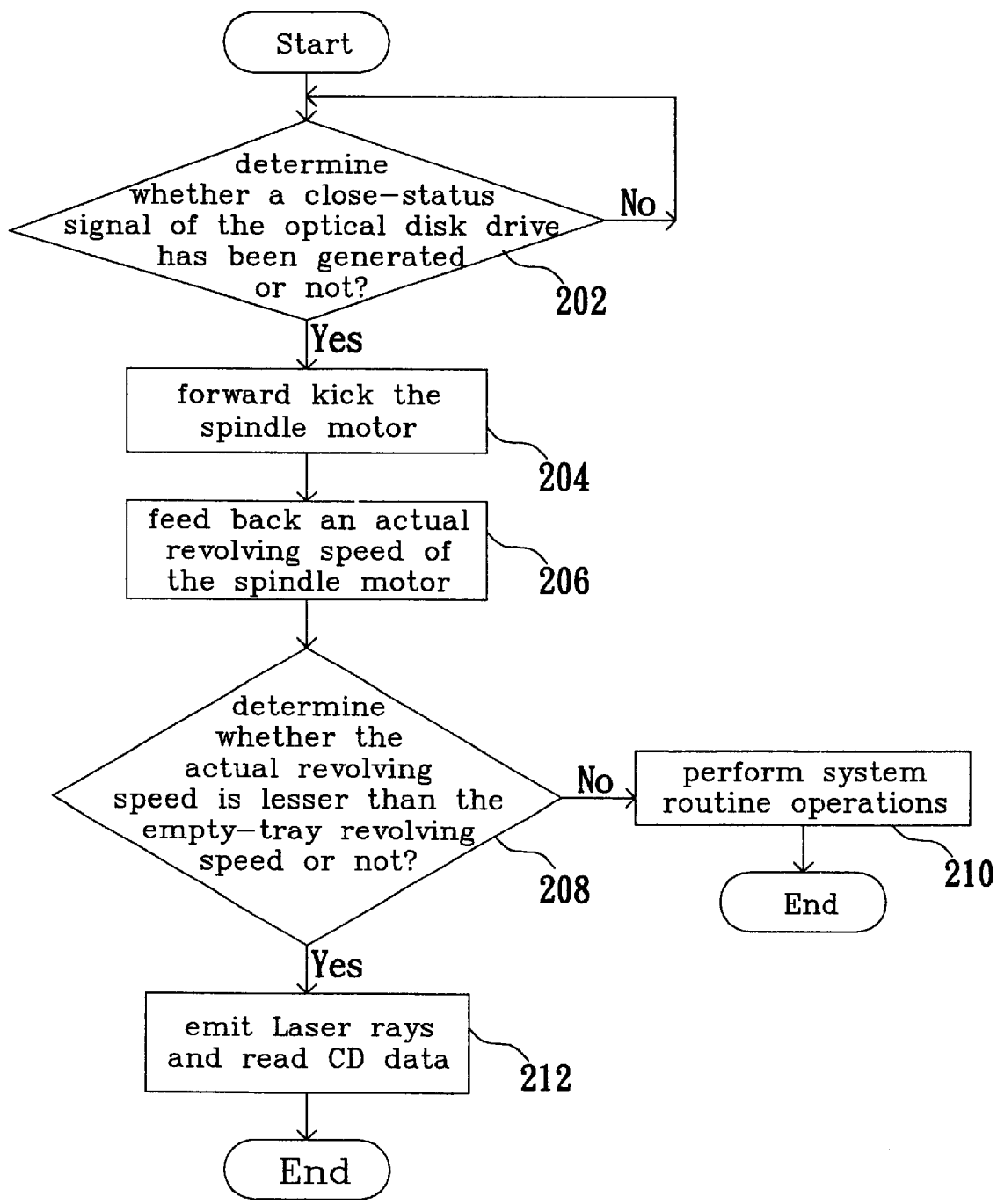
FIG. 2. shows a flowchart of a protection method that prevents optical disk drives from Laser leakage according to a preferred embodiment of the invention.

Please refer to FIG. 1 and FIG. 2, a flowchart of a protection method that prevents optical disk drive from Laser leakage according to a preferred embodiment of the invention. A tray type optical disk drive is used as an example. In FIG. 2, first of all, check whether the close-status signal of the optical disk drive has been generated in step 202 or not. When the tray 110 is open, the switch detector 108 will not be touched by the tray 110 thus generate no signal. Repeat this step. When the tray 110 closes to the casing 102, the switch detector 108 will be touched by the tray 110 and generate a close-status signal. Next, go to step 204. Having received the close-status signal, the control unit 106 which is coupled with the switch detector 108 will forward kick the spindle motor 112. The revolving speed of the spindle motor 112 at this moment is called the 'actual revolving speed' while 'forward kick' means to start the spindle motor using a larger torque. After that, go to step 206 and feed back the actual revolving speed of the spindle motor 112 to the control unit 106.

It is noteworthy that the spindle motor 112 is used to drive the CD 120. Before the optical disk drive 100 is loaded with the CD 120, the spindle motor 112, without carrying the weight of the CD 120, will run in an empty-tray revolving speed and have the memory of empty-tray revolving speed stored in the optical disk drive 100. When the optical disk drive 100 is loaded with the CD 120, the spindle motor 112, carrying the weight of the CD 120, will run in a speed lesser than the empty-tray revolving speed. According to the abovementioned principle, the invention particularly designs an electronic detecting method to determine whether the spindle motor 112 has been loaded with a CD or not. This method allows the control unit 106 to forward kick the spindle motor 112; and the spindle motor 112 will feed back the revolving-speed signal representing actual revolving speed to the control unit 106.

Next, go to step 208. The control unit determines whether the actual revolving speed represented by the revolving-speed signal is lesser than the empty-tray revolving speed or not. If the two speeds are identical then the optical disk drive 100 has not yet been loaded with the CD 120; go to step 210. The optical disk drive will not emit Laser rays and the system routine operations of the optical disk drive, a stand-by status for instance, will be performed. This method ends here. If the actual revolving speed is lesser than the empty-tray revolving speed then the optical disk drive has already been loaded with the CD 120; go to step 212. The control unit 106 will control the pickup head 114 to emit Laser rays and read data from the CD 120. This method ends here.

According to the embodiment of the invention, three revolving speeds are measured according to whether the spindle motor is loaded with an 8 cm-diameter CD, a 12 cm-diameter CD or without any CD being loaded respectively with the forward-kick time being set to 300 ms. In addition, a number of Hall sensors, say, three for instance, are used to detect how fast the spindle motor changes its revolving positions. The control unit can generate a number of Frequency Generator pulse (FG pulse), say, six for instance, corresponding to every revolution of the spindle motor. The more FG pulses are generated by the control unit, the faster the spindle motor revolves. The results are as follows:

1. When the spindle motor is loaded with a 12 cm-diameter CD, the control unit can generate 2 to 4 FG pulses within a forward-kick time of 300 ms.

2. When the spindle motor is loaded with an 8 cm-diameter CD, the control unit can generate 15 to 24 FG pulses within a forward-kick time of 300 ms.

3. When the spindle motor is not loaded with any CD, the control unit can generate more than 37 FG pulses within a forward-kick time of 300 ms and is called the 'empty-tray revolving speed'.

It is understood that the larger diameter the CD placed on the spindle motor has, the smaller revolving speed the spindle motor will have due to a greater revolving momentum. Furthermore, the revolving speed of the spindle motor will reach its maximum when not any CD is placed on the spindle motor.

Therefore, the invention has two stages in detection. First, a mechanic switch detector is used to detect the status of the optical disk drive. If the optical disk drive is closed, the switch detector will generate a close-status signal of the optical disk drive. Following this, go to the second stage of the detecting method to determine whether the optical disk drive has been loaded with a CD or not. On receiving the close-status signal of the optical disk drive, the control unit will forward kick the spindle motor accordingly, and the spindle motor will feed back the revolving speed signal representing actual revolving speed to the control unit. After that, the control unit compares the empty-tray revolving speed of the spindle motor stored in the optical disk drive with the actual revolving speed to find out if the optical disk drive has been loaded with a CD or not. If the actual revolving speed is lesser than the empty-tray revolving speed, then control the pickup head to emit Laser rays and read data from the CD preventing the optical disk drive from Laser leakage that causes harm to users.

Besides, if the detecting unit fails and mistakes the open/close status of the optical disk drive during the first stage of detecting, the electronic detecting method in stage two of the invention will make up the failure of stage one. However, any one who is familiar with this technique understands that the technology according to the invention is not limited to the abovementioned applications. The invention can be applied to open-top type and suck-in type optical disk drives, CD-Writers, and optical disk drives for TV game, MD and notebook computer as well preventing the optical disk drive from Laser leakage that causes harm to users.

The Laser leakage preventing method for optical disk drives is disclosed in the embodiment of the invention. Its electronic detecting method not only helps to reduce production cost but also effectively detects whether the optical disk drive has been loaded with a CD or not during the failure of the switch detector, thus avoiding Laser leakage that causes harm to users.

While the invention has been described by way of example and in terms of the preferred embodiment, it is to be understood that the invention is not limited to the disclosed embodiment. To the contrary, it is intended to cover various modifications and similar arrangements and steps, and the scope of the appended claims therefore should be accorded the broadest interpretation so as to encompass all such modifications and similar arrangements and steps.

What is claimed is:

1. A protection method applied to an optical disk drive preventing Laser leakage, the optical disk drive being able to accommodate a CD and comprising at least a switch detector, a spindle motor and a pickup head, wherein the switch detector is used to detect the open/close status of the optical disk drive, under normal circumstances, when the optical disk drive is close, the switch detector will be initiated and generate a close-status signal whereas the spindle motor which is used to drive the CD has an empty-tray revolving speed when the optical disk drive is not loaded with any CD, when the optical disk drive has been loaded with a CD, the spindle motor has a revolving speed lesser than the empty-tray revolving speed and the pickup head will emit Laser rays to read data from the CD, the protection method comprises:

determining whether a close-status signal has been generated or not, if yes, then forward kicking the spindle motor;

feeding back the actual revolving speed of the spindle motor to the spindle motor; and determining whether the actual revolving speed is lesser than the empty-tray revolving speed or not, if yes, then emitting Laser rays to read CD data, otherwise, halting emitting Laser rays and performing system routine operations of the optical disk drive.

2. A protection method according to claim 1, wherein the optical disk drive is a tray type optical disk drive.

3. A protection method according to claim 1, wherein the optical disk drive is an open-top type optical disk drive.

4. A protection method according to claim 1, wherein the optical disk drive is a Compact Disk-Read Only Memory drive (CD-ROM drive).

5. A protection method according to claim 1, wherein the optical disk drive is a Digital Versatile Disk player (DVD-ROM player).

6. A protection method applied to an optical disk drive preventing Laser leakage, the optical disk drive comprising at least a spindle motor and a pickup head, wherein the pickup head emits Laser rays to read data from CD, the protection method comprises:

determining whether the optical disk drive is closed or not, if yes, then forward kicking the spindle motor; and determining whether the actual revolving speed of the spindle motor is lesser than the empty-tray revolving speed or not, if yes, then emitting Laser rays to read data from CD.

7. A protection method according to claim 6, further comprising a step of stopping emitting Laser rays and perform routine system operations of the optical disk drive if the actual revolving speed of the spindle motor is determined to be greater than the empty-tray revolving speed.

8. A protection method according to claim 7, wherein the above-mentioned routine system operations of the optical disk drive comprises at least the stand-by status.

9. A protection method according to claim 6, further comprising a switch detector which is used to determine whether the abovementioned optical disk drive is close or not, wherein the switch detector generates a close-status signal of the optical disk drive if the optical disk drive is determined to be close.

10. A protection method according to claim 6, wherein the above-mentioned optical disk drive comprises a control unit used to determine whether the abovementioned actual revolving speed is lesser than the abovementioned empty-tray revolving speed.

11. A protection method according to claim 6, further comprising a step of feeding back a signal representing an actual revolving speed of the spindle motor.

12. A protection method according to claim 6, wherein the above-mentioned empty-tray revolving speed is the revolving speed of the abovementioned spindle motor when the abovementioned optical disk drive is not loaded with any CD.

* * * * *